United States Patent
Duan et al.

(10) Patent No.: US 9,079,485 B2
(45) Date of Patent: Jul. 14, 2015

(54) HYBRID ELECTRIC VEHICLE

(76) Inventors: Zhihui Duan, Ann Arbor, MI (US); LingLing Zhang, Ann Arbor, MI (US)

(*) Notice: Subject to any disclaimer, the term of this patent is extended or adjusted under 35 U.S.C. 154(b) by 1622 days.

(21) Appl. No.: 12/317,579

(22) Filed: Dec. 27, 2008

(65) Prior Publication Data

US 2009/0166109 A1   Jul. 2, 2009

(51) Int. Cl.
| | | |
|---|---|---|
| *B60W 10/06* | (2006.01) | |
| *B60K 6/48* | (2007.10) | |
| *B60K 6/383* | (2007.10) | |
| *B60K 6/387* | (2007.10) | |
| *B60W 10/02* | (2006.01) | |
| *B60W 10/08* | (2006.01) | |
| *B60W 20/00* | (2006.01) | |

(52) U.S. Cl.
CPC . *B60K 6/48* (2013.01); *B60K 6/383* (2013.01); *B60K 6/387* (2013.01); *B60W 10/02* (2013.01); *B60W 10/06* (2013.01); *B60W 10/08* (2013.01); *B60W 20/00* (2013.01); *B60L 2240/441* (2013.01); *B60W 20/40* (2013.01); *B60W 2510/0638* (2013.01); *B60W 2520/10* (2013.01); *B60W 2710/025* (2013.01); *Y02T 10/6221* (2013.01); *Y02T 10/6286* (2013.01)

(58) Field of Classification Search
CPC ..... B60W 10/06; B60W 10/08; B60W 10/02; B60W 20/00; B60W 20/40; B60K 6/48; B60K 6/38; B60K 6/383; B60K 6/387
USPC ....................................................... 180/65.28
See application file for complete search history.

(56) References Cited

U.S. PATENT DOCUMENTS

| | | | | |
|---|---|---|---|---|
| 5,343,970 A * | 9/1994 | Severinsky | ................. | 180/65.25 |
| 5,842,534 A * | 12/1998 | Frank | ........................ | 180/65.25 |
| 5,856,709 A * | 1/1999 | Ibaraki et al. | .................. | 290/45 |
| 6,026,921 A * | 2/2000 | Aoyama et al. | ............ | 180/65.25 |
| 6,176,808 B1 * | 1/2001 | Brown et al. | ..................... | 477/5 |
| 6,364,042 B1 | 4/2002 | Joachim | | |
| 6,396,165 B1 * | 5/2002 | Nagano et al. | ................ | 903/910 |
| 6,655,484 B2 | 12/2003 | Levin | | |
| 7,093,517 B2 * | 8/2006 | Hanyu et al. | .................... | 74/661 |
| 7,465,251 B2 * | 12/2008 | Zhang | ................ | 477/5 |
| 7,487,852 B2 * | 2/2009 | Leone et al. | ............... | 180/65.28 |
| 7,987,934 B2 * | 8/2011 | Huseman | ................... | 180/65.21 |
| 8,002,059 B2 * | 8/2011 | Tanishima | ............... | 180/65.275 |
| 8,342,272 B2 * | 1/2013 | Gee | ............ | 180/65.28 |
| 2003/0078126 A1 * | 4/2003 | Holmes et al. | ..................... | 475/5 |
| 2006/0169504 A1 * | 8/2006 | Oliver et al. | ................. | 180/65.2 |

* cited by examiner

*Primary Examiner* — James M Dolak

(57) ABSTRACT

A hybrid electric drive system for an automotive vehicle comprises a heat engine, an electric motor, a one-way-clutch, a torque-limiting clutch, and a transmission. The one-way-clutch disposed between the engine shaft and the motor shaft, and it can transmit torque from the engine shaft to the motor shaft. The transmission has an input shaft being connected to the motor shaft and an output shaft to drive the wheels. The torque-limiting clutch is also disposed between the engine shaft and the motor shaft. When it is disengaged, the torque-limiting clutch disconnects the motor shaft from the engine shaft, so the motor can solely drive the vehicle. When it is engaged, the clutch transmits a pre-determined level of torque from the motor shaft to the engine shaft in order to start the engine. The torque limiting clutch will smooth out the torque peak when the system starts the engine while the vehicle is running.

2 Claims, 2 Drawing Sheets

HYBRID ELECTRIC VEHICLE

CROSS-REFERENCE TO RELATED APPLICATION

This application claims the benefit of PA Ser. Nr. 200720302330.1, filed Dec. 28, 2007 in P. R. China by the present inventor.

FEDERALLY SPONSORED RESEARCH

Not Applicable

SEQUENCE LIST OR PROGRAM

Not Applicable

TECHNICAL FIELD

The present invention relates to hybrid electric vehicles, and more specifically, to a hybrid electric vehicle having an electric motor that is coupled between the engine and transmission.

BACKGROUND OF THE INVENTION

In a conventional vehicle, an internal combustion engine generates rotary power by burning fuel, and the power is transmitted to the driving wheels through a mechanical transmission. The engine is the only power supply to the vehicle and has to provide all the torque that the vehicle needs. When cruising on a flat road, the vehicle only needs relatively small power or torque to maintain its speed, but it takes much more power or torque to accelerate or go uphill. The engine has to be able to provide the torque required for acceleration and uphill, so the engine must be very powerful. Usually a bigger engine loss more energy due to friction than a smaller one. On the other hand, high power is needed only for a small fraction of working time, so for most of the time, a significantly small engine will work well for the vehicle, and it can save a lot of energy. When the vehicle applies braking, the kinetic energy of the vehicle is converted into heat, and a lot of energy is lost.

Also, when a conventional vehicle stops at traffic light, the engine keeps running, burning out fuel unnecessarily.

In order to improve fuel efficiency and reduce emission, hybrid electric vehicles are proposed. One or more electrical motors are used to assist the engine when high torque is needed, so a smaller engine may work well. The motor(s) also can re-generate electric power while applying brake torque on the wheels. An electric energy storage device is employed to store electric energy when it is available and to provide energy to the motor(s) when needed.

One of hybrid electric drive systems proposed has an electric motor between the engine and the transmission, and the motor shaft (rotor shaft) is permanently connected to the crankshaft of the engine. During startup of the vehicle, the motor functions as a starter, rotating the crankshaft of the engine while the cylinders are fired. After the engine is started, the motor is used as a generator to maintain the electrical system of the vehicle. The motor can assume other functions such as stopping and restarting the engine to save fuel during idle and deceleration, aiding the engine during heavy accelerations and capturing energy during decelerations.

One drawback to such a system is that the motor shaft is fixedly attached to the engine shaft. When the engine is not operating, it may be desirable to provide the transmission with power supplied by the electric motor. However, to do this the crankshaft of the engine is rotated. This is inefficient because an increased amount of power must be provided.

To solve this problem, a system is proposed in U.S. Pat. No. 6,364,042. It comprises an engine, an electric motor (starter/generator), a transmission, and a clutch. The motor shaft is connected to the transmission input shaft, and the clutch selectively couples the motor shaft and the engine shaft. In the case that it is desirable to run solely on electric power, the clutch is used to disengage the engine shaft from the motor shaft. This allows the motor to operate as a motor to power the vehicle without having to rotate the engine shaft. This mode of operation is useful at low speeds such as in city driving. When desired, the system controller can control the system to operate with the engine, and the motor can operate as an alternator to charge the batteries.

One drawback to such a system is that: it takes many steps and a long time to start the engine while the vehicle is running. Here are the steps: Step 1, disengage the main clutch in the transmission to disconnect the motor shaft from the transmission shaft. Step 2, slow down the motor to zero speed. Step 3, engage the clutch and connect the engine shaft to the motor shaft. Step 4, speed up the engine shaft and start the engine when it reaches its idle speed. Step 5, engage the main clutch in the transmission and connect the engine to the transmission input shaft. It would take up to a couple of seconds to go through all the steps, and the vehicle does not have power meanwhile. This is a significant issue for the vehicle's performance.

The purpose of this invention is to provide a hybrid electric drive system that can start the engine quickly and smoothly and does not need a complicated control system.

SUMMARY OF THE INVENTION

A hybrid electric vehicle according to the present invention comprises a heat engine, a one-way-clutch, a torque limiting device, an electric motor, and a transmission.

The engine converts fuel energy into mechanical energy and outputs torque through its shaft.

The transmission has an input shaft and output shaft, and the output shaft is connected to vehicle's wheels.

The one-way-clutch is disposed between the engine shaft and the motor shaft, and it can transmit forward torque from the engine to the motor but not from the motor to the engine. In another ward, it allows the motor to overrun the engine. When the engine is working, its torque is transmitted to the motor shaft and then to the transmission input shaft through the one-way-clutch.

The torque-limiting device selectively engages and disengages the engine shaft with the motor shaft. When engaged, it can transmit a pre-determined level of torque. The level of torque is set during manufacturing.

When the torque-limiting device is disengaged, the motor can drive the vehicle solely, without rotating the engine, so no energy loss is caused due to engine's friction and air-pumping torque.

To start the engine while the vehicle is running, the torque-limiting device is engaged. It transmits a pre-determined level of torque from the motor to the engine shaft and the torque turns the engine shaft forwards. When reaching its idle speed, the engine starts.

If a conventional clutch is used to start the engine while the vehicle is running, the engine shaft tends to apply a strong backward torque on the input shaft of the transmission. In the system proposed in the present invention, a torque-limiting device is used to engage the engine shaft with the motor shaft and to smooth out the torque peak.

The torque-limiting device 5 is such a device that can transmit a pre-determined level of torque. If this amount of torque is exceeded, the device will slip and still transmit the pre-determined level of torque.

The system can start the engine and generate electricity while the vehicle is at still. The motor can drive the vehicle while the engine is off, and the system can start the engine quickly and smoothly while the vehicle is running. When working, the engine can drive the vehicle in the same way as in a conventional vehicle and provide power for the motor to generate electricity. The motor can assist the engine to drive and apply re-generative braking.

DETAILED DESCRIPTION OF THE PREFERRED EMBODIMENTS

First Preferred Embodiment

Figure 1:
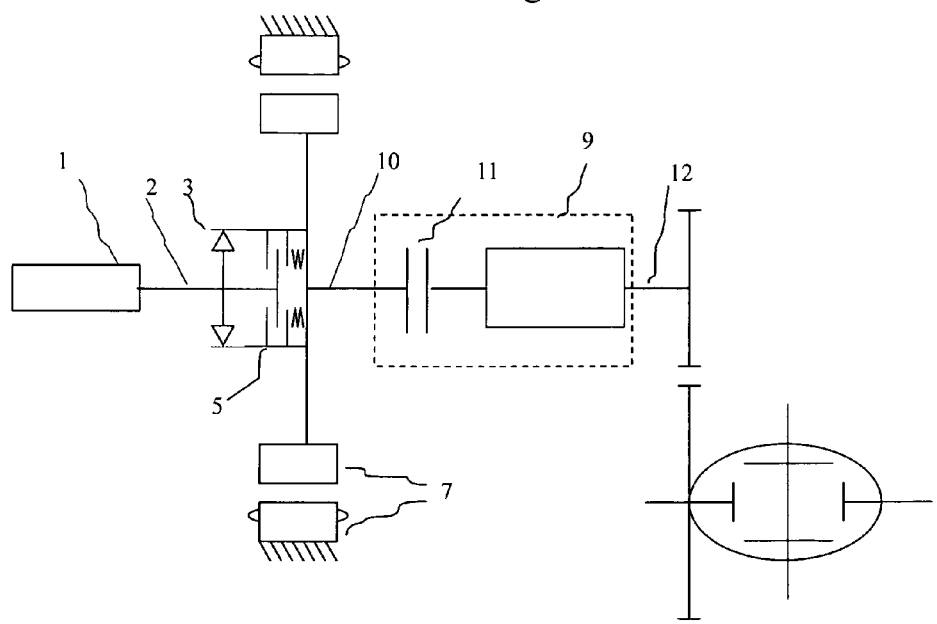
FIG. 1 shows the schematic view of a hybrid electric drive system according to a first embodiment of the present invention.

FIG. 1 shows the schematic view of a hybrid electric drive system according to a first preferred embodiment of the present invention. The hybrid electric drive system comprises: a heat engine 1 with an output shaft 2, a one-way-clutch 3, a torque-limiting device 5, an electric motor 7, and a transmission 9.

Engine 1 converts fuel energy into mechanical energy and outputs torque through engine shaft 2.

Motor 7 can convert the electric energy from a set of power battery (not shown) into mechanical energy and outputs torque through a motor shaft 10. It can also output braking torque during deceleration and, at the same time, recover the kinetic energy of the vehicle into electric energy for the battery to store.

Transmission 9 has an input shaft connected to motor shaft 10 and an output shaft 12, and output shaft 12 is connected to vehicle's wheels.

One-way-clutch 3 is disposed between engine shaft 2 and motor shaft 10, and it can transmit forward torque from engine shaft 2 to motor shaft 10, but not from motor shaft 10 to engine shaft 2. In another ward, it allows motor shaft 10 to overrun engine shaft 2. When engine 1 is working, its torque is transmitted through one-way-clutch 3 to motor shaft 10 which is connected to the input shaft of transmission 9.

Torque-limiting device 5 selectively disengages and engages engine shaft 2 with motor shaft 10, and it is used to start the engine smoothly while the vehicle is running.

Torque-limiting device 5 is such a device that, when engaged, can transmit a pre-determined level of torque. If this amount of torque is exceeded, the device will slip and still transmit the pre-set level of torque. One embodiment of the torque-limiting device is a multi-plate slipping clutch engaged by means of spring pressure.

Figure 2:
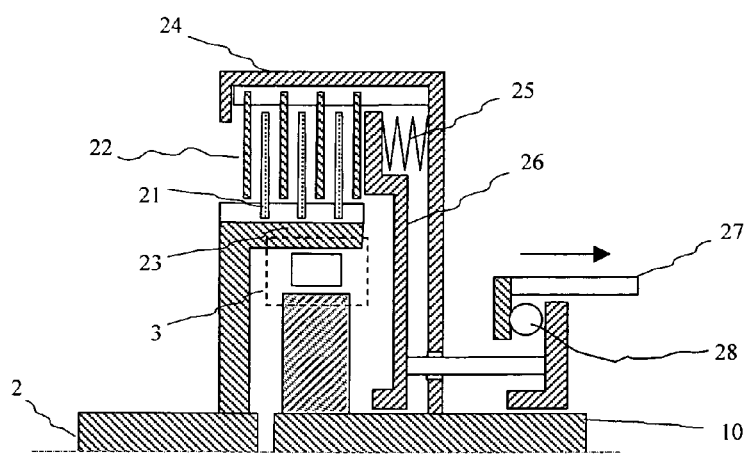
FIG. 2 is a cross section view of a one-way-clutch and a torque-limiting clutch according to a first embodiment of the present invention.

FIG. 2 is a cross section view of torque-limiting clutch. The clutch comprises a pack of friction plates 21 and mating separator plates 22, a splines hub 23 at the inside diameter of the pack that supports the friction plates 21 and transmits torque, a drum 24 at the outside diameter of the pack that receives the outer lugs of the separator plates 22 and transmits torque, and a set of springs 25 that applies normal force to compress and thus to engage the pack. The torque that the clutch can transmit is pre-determined by setting the spring pressure during manufacturing, because the torque is proportional to the spring pressure. To disengage clutch 5, an actuator (not shown) pulls a bar 27 to the right, and the force goes through a pushing bearing 28 to a pushing plate 26; pushing plate 26 compresses springs 25 and release the pack, and so clutch 5 is disengaged. To engage clutch 5, the actuator releases bar 27, and pushing plate 26 releases springs 25; springs 25 compresses and engages the pack, so the clutch 5 is engaged.

When torque-limiting clutch 5 is disengaged, motor 7 can drive the vehicle solely, without rotating engine shaft 2, so no energy loss is caused by engine's friction and air-pumping torque.

When torque-limiting clutch 5 is engaged, it transmits a pre-determined level of torque from motor shaft 10 to start engine 31 while the vehicle is running. It can also smooth out the torque peak that engine shaft 2 applies on the input shaft of transmission 9 during engine's start-up.

When the engine 1 is working, its torque is transmitted through one-way-clutch 3 to motor shaft 10 and the input shaft of transmission 9.

Operations:

The system can start engine 1 while the vehicle is at still. Before engine 1 is started, engine shaft 2 and motor shaft 10 have zero speed. In order to start the engine, clutch 5 is engaged but a main clutch 11 in transmission 9 is disengaged. Motor 7 runs forwards, and the motor torque goes through clutch 5 to engine shaft 2. The torque rotates engine shaft 2 forwards, and engine 1 starts when it reaches its idle speed. Since main clutch 11 is disengaged, no torque can go to the wheels, so the vehicle stays still.

When engine 1 works, it outputs torque through one-way-clutch 3 to motor shaft 10 and drives the vehicle in the same way as in a conventional vehicle. At the same time, clutch 5 stays engaged, so engine shaft 2 and motor shaft 10 are locked together. When high torque is required, motor 7 outputs forward torque and assist engine 2 to drive the vehicle. When the engine torque is enough to drive the vehicle, motor 7 may either run idle or generate electricity by using engine torque.

The system can apply regenerative braking. Before braking is applied, clutch 5 and main clutch 11 are engaged, and motor 7 and engine 1 are driving. When braking is applied, motor 7 applies a braking (backward) torque to transmission 9, and engine 1 runs idle or is turned off, outputting braking torque to transmission 9. When motor 7 apply braking torque, it converts vehicle's kinetic energy into electric energy for the battery to store. When the vehicle is under a certain (safe) speed, clutch 5 may be disengaged and engine 1 may be turned off, so that more kinetic energy can be converted into electric energy.

The system can drive the vehicle with motor 7 while engine 1 is off. In this mode, engine 1 is off, clutch 5 is disengaged and main clutch 11 is engaged. Motor 7 runs forwards and outputs a torque through its shaft 10. The motor torque goes through main clutch 11 and transmission 9 and drives the wheels. The torque will not go through clutch 5 to engine shaft 2 since clutch 5 is disengaged. The torque will not go through one-way-clutch 3 to engine shaft 2, either, because one-way-clutch 3 allows motor shaft 10 to overrun engine shaft 2. So motor 7 is able to drive the vehicle on its own, without rotating engine shaft 2.

The system can start engine 1 while the vehicle is running. When motor 7 drive the vehicle solely to a certain speed, the system needs to start engine 1 while the vehicle is running. Before engine 1 is started, clutch 5 is disengaged, and engine shaft 2 is at zero speed while motor shaft 10 is rotating. In order to start engine 1, clutch 5 is engaged, and it transmits forward torque from motor shaft 10 to engine shaft 2. The torque cranks engine 1, and engine 1 starts when it reaches its idle speed. At the same time, motor 7 outputs forward torque to balance the negative torque that engine shaft 2 applies on the input shaft of transmission 9. After it is started, engine 1 outputs its torque through one-way-clutch 3.

If a conventional clutch is used to start engine 2 while the vehicle is running, engine shaft 2 tends to apply a strong backward torque on the input shaft of transmission 9. The torque peak will result in a sudden speed change and give a shock to the people in the vehicle. It will also cause high level of stress and the stress may cause damage on the structure. It is unacceptable, and the issue has to be solved. In the system proposed in the present invention, clutch 5 is a torque-limiting clutch, and it can smooth out the peak torque. During engine's start-up, only pre-determined level of torque can be transmitted through clutch 5 and applied on the input shaft of transmission 9. The level of torque is pre-determined by setting the spring pressure during manufacturing. The torque should be set as low as possible under the condition that it can transmit enough torque to crank engine in a certain time period.

For example, the engine shaft has friction torque of 35 N-m and inertia moment of $0.14$ kg-m$^2$, and the engine is required to be accelerated from 0 rpm to 800 rpm in 0.4 second. Then the average acceleration should be about 200 rad/sec$^2$, and a net torque of 24 N-m is needed for that acceleration. Considering the friction, the level of torque may be set around 59 N-m.

Although at a low level, engine shaft 2 still applies a backward torque on the input shaft of transmission 9 during engine's start-up. The torque will result in an unintended and unwanted deceleration. Motor 7 can output forward torque to balance the negative torque. As in the example above, motor 7 should output at least 59 N-m of torque.

Since clutch 5 can transmit only a low level of torque, it is not capable to transmit the engine torque, because the engine torque is at much higher level. So the engine torque goes through one-way-clutch 3 to the input shaft of transmission 9.

Second Preferred Embodiment

Figure 3:
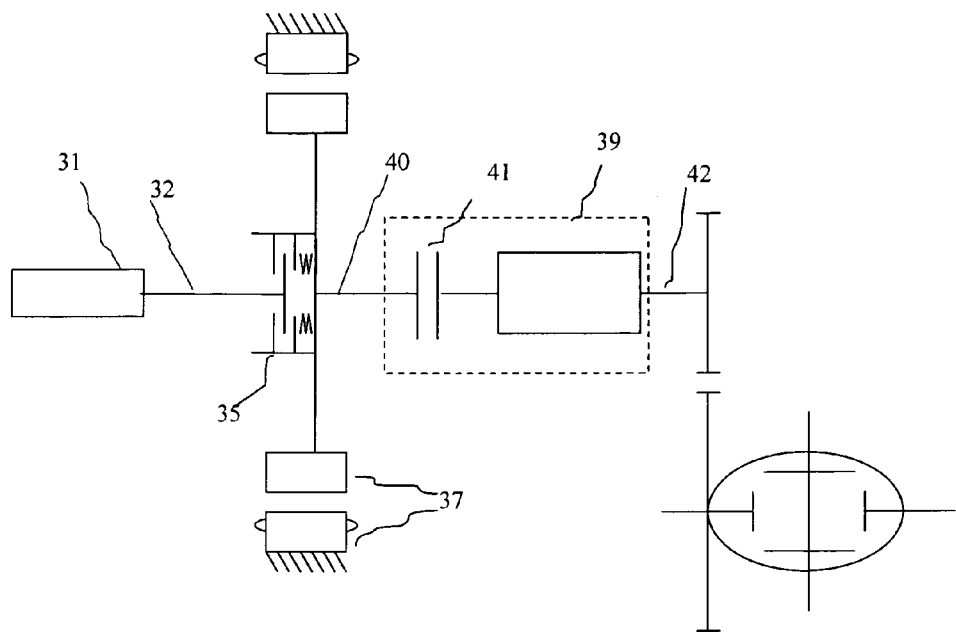
FIG. 3 shows the schematic view of a hybrid electric drive system according to a second embodiment of the present invention.

FIG. 3 shows the schematic view of a hybrid electric drive system according to a second preferred embodiment of the present invention. The hybrid drive system comprises: a heat engine 31 with an output shaft 32, a torque-control device 35, an electric motor 37, and a transmission 39.

Engine 31 converts fuel energy into mechanical energy and outputs torque through engine shaft 32.

Motor 37 can convert the electric energy from a battery (not shown) into mechanical energy and outputs torque through a motor shaft 40. It can also output braking torque during deceleration and, at the same time, recover the kinetic energy of the vehicle into electric energy for the battery to store.

Transmission 39 has an input shaft connected to motor shaft 40 and an output shaft 42, and output shaft 42 is connected to vehicle's wheels.

Torque-control device 35 selectively disengages, partially engages and fully engages engine shaft 32 with motor shaft 40.

When torque-control device 35 is partially engaged, it can transmit a pre-determined level of torque. If this amount of torque is exceeded, the device will slip and still transmit the pre-set level of torque. When fully engaged, torque-control device can transmit high level of torque. One embodiment of the torque-control device is a multi-plate slipping clutch engaged by means of hydraulic pressure.

Figure 4:
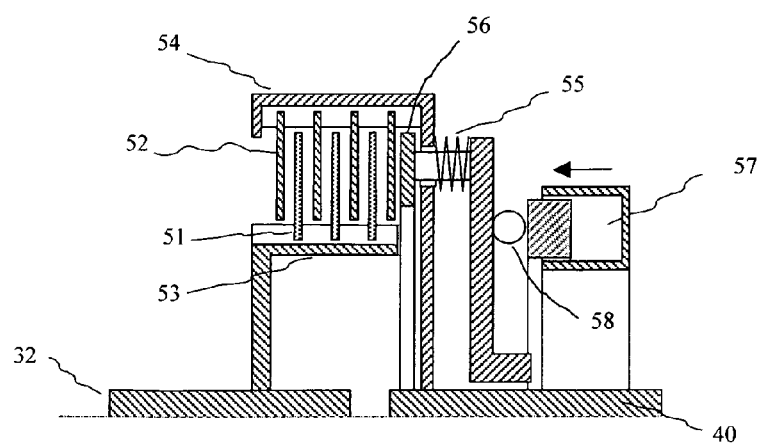
FIG. 4 is a cross section view of a torque-control clutch according to a second embodiment of the present invention.

FIG. 4 is a cross section view of a torque-control clutch. The clutch comprises a pack of friction plates 51 and mating separator plates 52, a splines hub 53 at the inside diameter of the pack that supports friction plates 51 and transmits torque, and a drum 54 at the outside diameter of the pack that receives the outer lugs of separator plates 52 and transmits torque. A hydraulic actuator 57 is used to apply normal force to compress and thus to engage the pack. The force by actuator 57 goes through a pushing bearing 58 and a pushing plate 56.

The torque that the clutch can transmit is proportional to the normal force (engaging force). Clutch 35 can selectively disengage, partially engage or fully engage shaft 32 with motor shaft 40, by controlling the hydraulic pressure for actuator 57. When the pressure goes down to zero, actuator 57 does not apply any force, and return springs 55 pushes plate 56 back and release the pack, so clutch 35 is disengaged. When the pressure goes up to a pre-determined level, actuator 57 applies a pre-determined force on pushing plate 56, and clutch 35 is partially engaged and can transmit a pre-determined level of torque. When the pressure goes up to full scale, actuator 57 applies a full scale of engaging force on the pack, and clutch 35 is fully engaged and can transmit high level of torque.

When torque-control clutch 35 is disengaged, motor 37 can drive the vehicle solely, without rotating engine shaft 32, so no energy loss is caused by engine's friction and air-pumping torque.

When torque-control clutch 35 is partially engaged, it transmits a pre-determined level of torque from motor shaft 40 to start engine 31 while the vehicle is running. It can also smooth out the torque peak that engine shaft 32 applies on the input shaft of transmission 39 during engine's start-up.

When engine 31 is started, clutch 35 is fully engaged, so the engine torque can be transmitted to motor shaft 40 and the input shaft of transmission 39.

Operations:

The system can start engine 31 while the vehicle is at still. Before engine 31 is started, engine shaft 32 and motor shaft 40 have zero speed. In order to start engine 31, clutch 35 is engaged but a main clutch 41 in transmission 9 is disengaged. Motor 37 runs forwards, and the motor torque goes through clutch 35 to engine shaft 32. The torque rotates engine shaft 32 forwards, and engine 31 starts when it reaches its idle speed. Since main clutch 41 is disengaged, no torque can go to the wheels, so the vehicle stays still.

When engine 31 works, clutch 35 is fully engaged and it locks engine shaft 32 and motor shaft 40 together, so that engine 31 can output torque to motor shaft 40 and to transmission 9. Now engine 31 drives the vehicle in the same way as in a conventional vehicle. When high torque is required, motor 37 outputs forward torque and assist engine 31 to drive the vehicle. When the engine torque is enough, motor 37 may either run idle or generate electricity by using the engine torque.

The system can apply regenerative braking. Before braking is applied, clutch 35 and main clutch 41 are engaged, and motor 37 and engine 31 are driving. When braking is applied, motor 37 applies a braking (backward) torque to transmission 39, and engine 31 runs idle or is turned off, outputting braking torque to transmission 39. When motor 37 applies braking torque, it converts the vehicle's kinetic energy into electric energy for the battery to store. When the vehicle is under a certain (safe) speed, clutch 35 may be disengaged and engine 31 may be turned off, so that more kinetic energy can be converted into electric energy.

The system can drive the vehicle only with motor 37 while engine 31 is off. In this mode, engine 31 is off, clutch 35 is disengaged, but main clutch 41 is engaged. Motor 37 runs forwards and outputs a torque through motor shaft 40. The motor torque goes through main clutch 41 to transmission 39 and drives the wheels. The torque will not go through clutch 35 to engine shaft 32 since clutch 35 is disengaged. So motor 37 is able to drive the vehicle on its own, without rotating engine shaft 32.

The system can start engine 31 while the vehicle is running. When motor 37 drive the vehicle solely to a certain speed, the system needs to start engine 31 while the vehicle is running. Before engine 31 is started, clutch 35 is disengaged, and engine 31 is at zero speed while motor shaft 40 is rotating. In order to start engine 31, clutch 35 is partially engaged, and it transmits a pre-determined level of forward torque from motor shaft 40 to engine shaft 32. The torque cranks engine 31, and engine 31 starts when it reaches its idle speed. At the same time, motor 37 outputs forward torque to balance the negative torque that engine shaft 32 applies on the input shaft of transmission 39. After engine 31 is started, clutch 35 is fully engaged and now it can transmit all the engine torque to motor shaft 40 and the input shaft of transmission 39.

If clutch 35 is fully engaged to start engine 32 while the vehicle is running, engine shaft 32 tends to apply a strong backward torque on the input shaft of transmission 39. The torque peak will result in a sudden speed change and give a shock to the people in the vehicle. It will also cause high level of stress and the stress may cause damage on the structure. It is unacceptable, and the issue has to be solved. In the system proposed in the present invention, clutch 35 is partially engaged, transmitting a pre-determined level of torque, and so it can smooth out the peak torque. During engine's start-up, only pre-determined level of torque can be transmitted through clutch 35 and applied on the input shaft of transmission 39. The torque should be set as low as possible under the condition that it can transmit enough torque to crank engine in a certain time period.

For example, the engine shaft has friction torque of 35 N-m and inertia moment of 0.14 kg-m$^2$, and the engine is required to be accelerated from 0 rpm to 800 rpm in 0.4 second. The average acceleration should be about 200 rad/sec$^2$, and a net torque of 24 N-m is needed for that acceleration. Considering the friction torque, the level of torque may be set around 59 N-m.

Although at a low level, engine shaft 32 still applies a backward torque on the input shaft of transmission 39 during engine's start-up. The torque will result in an unintended and unwanted deceleration. Motor 37 can output forward torque to balance the negative torque. As in the example above, motor 37 should output at least 59 N-m of torque.

After engine 31 is started, clutch 35 is fully engaged, so it can transmit all the engine torque to motor shaft 40 and transmission 39.

It should be understood that there is no intention to limit the invention to the specific forms disclosed, but on the contrary, the invention is to cover all variations, modifications and improvements that come with the true spirit and scope of the invention as expressed in the appended claims.

The invention claimed is:

1. A hybrid electric drive system for an automotive vehicle comprising:
    a heat engine outputting power through a crankshaft;
    a transmission having an input shaft and an output shaft;
    an electric motor having a motor shaft being connected to said input shaft;
    a one-way-clutch disposed between said crankshaft and said motor shaft, being able to transmit torque from said crankshaft to said motor shaft but nut from said motor shaft to said crankshaft; and
    a torque-limiting device disposed between said crankshaft and the rotor of said electric motor, said torque limiting device selectively coupling said crankshaft and said motor shaft, said torque-limiting device transmitting a pre-determined level of torque when engaged;
    wherein when said torque-limiting device is disengaged, said motor can drive the vehicle solely; when said torque-limiting device is engaged, said motor can crank said engine; in order to start said engine while the vehicle is running, said torque-limiting device is engaged and transmits a torque to crank said engine and smoothes out the reaction torque peak that said crankshaft applies on said motor shaft; said engine outputs power through said one-way-clutch to said motor shaft and said input shaft.

2. A hybrid electric drive system for an automotive vehicle according to claim 1 wherein said torque-limiting device is a torque-limiting clutch.

* * * * *